United States Patent
Shilov et al.

(10) Patent No.: US 10,194,411 B2
(45) Date of Patent: Jan. 29, 2019

(54) USER EQUIPMENT AND SYNCHRONIZATION METHODS FOR DEVICE TO DEVICE (D2D) COMMUNICATION

(71) Applicant: Intel Corporation, Santa Clara, CA (US)

(72) Inventors: Mikhail Shilov, Nizhny Novgorod (RU); Alexey Vladimirovich Khoryaev, Nizhny Novgorod (RU); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/505,387

(22) PCT Filed: Sep. 24, 2015

(86) PCT No.: PCT/US2015/051857
§ 371 (c)(1),
(2) Date: Feb. 21, 2017

(87) PCT Pub. No.: WO2016/049270
PCT Pub. Date: Mar. 31, 2016

(65) Prior Publication Data
US 2017/0273042 A1 Sep. 21, 2017

Related U.S. Application Data
(60) Provisional application No. 62/055,586, filed on Sep. 25, 2014.

(51) Int. Cl.
*H04W 56/00* (2009.01)
*H04W 88/02* (2009.01)
*H04W 88/08* (2009.01)

(52) U.S. Cl.
CPC .......... *H04W 56/002* (2013.01); *H04W 88/02* (2013.01); *H04W 88/08* (2013.01)

(58) Field of Classification Search
CPC .................................................. H04W 56/002
See application file for complete search history.

(56) References Cited

U.S. PATENT DOCUMENTS

| | | | | |
|---|---|---|---|---|
| 2009/0220015 A1* | 9/2009 | Fu | ................ | H04L 27/2659 375/260 |
| 2011/0129008 A1* | 6/2011 | Chmiel | ................ | H04J 11/0073 375/224 |

(Continued)

FOREIGN PATENT DOCUMENTS

| | | |
|---|---|---|
| CN | 106605433 | 4/2017 |
| JP | 2010517452 | 5/2010 |

(Continued)

OTHER PUBLICATIONS

"3GPP; TSG RAN; Study on LTE Device to Device Proximity Services", Radio Aspects (Release 12); 3GPP TR 36.843 V12.0.1, [Online] retrieved from the internet:http://www.3gpp.org/dynareport/36843.htm, (Mar. 27, 2014).

"International Application Serial No. PCT/US2015/051857, International Search Report dated Mar. 18, 2016", 3 pgs.

"International Application Serial No. PCT/US2015/051857, Written Opinion dated Mar. 18, 2016", 9 pgs.

(Continued)

*Primary Examiner* — Ronald B Abelson
(74) *Attorney, Agent, or Firm* — Schwegman Lundberg & Woessner, P.A.

(57) ABSTRACT

Embodiments of a User Equipment (UE) and methods for device-to-device (D2D) communication are generally described herein. In some embodiments, the UE may determine a network reference timing based on a reception of a primary synchronization signal (PSS) from an Evolved (Continued)

Node-B (eNB). The UE may transmit a primary device-to-device synchronization signal (PD2DSS) to a second UE according to the determined network reference timing. The PD2DSS may be configured to enable synchronization for a device-to-device (D2D) communication session between the UE and the second UE. In some embodiments, the PD2DSS may be based on multiple PD2DSS symbol sequences, which may be different than PSS symbol sequences used for the PSS. In some embodiments, different Zadoff-Chu (ZC) sequences may be used for the PD2DSS and for the PSS.

27 Claims, 6 Drawing Sheets

(56) References Cited

U.S. PATENT DOCUMENTS

| | | | |
|---|---|---|---|
| 2011/0310878 | A1 | 12/2011 | Lindoff et al. |
| 2013/0229953 | A1 | 9/2013 | Nam et al. |
| 2014/0094183 | A1 | 4/2014 | Gao et al. |
| 2015/0296469 | A1* | 10/2015 | Yoon ............ H04W 56/0015 370/350 |
| 2015/0304149 | A1 | 10/2015 | Kim et al. |

FOREIGN PATENT DOCUMENTS

| | | |
|---|---|---|
| WO | 2013125925 | 8/2013 |
| WO | 2014035805 | 3/2014 |

OTHER PUBLICATIONS

"PD2DSS structure with repeated PSS symbol", R1-143099, 3GPP TSG RAN WG1 Meeting #78, Dresden, Germany, [Online] retrieved from the internet:http://www.3gpp.org/ftp/tsg_ran/WGI_RL1/TSGR1_78/Docs/R1-143099.zip, (Aug. 10, 2014).

"Japanese Application Serial No. 2017-514836, Office Action dated Feb. 20, 2018", W English Translation, 8 pgs.

"Details on D2D synchronization signal design", ITL Inc., 3GPP TSG-RAN WG1#78 R1-143289, (Aug. 22, 2014), 6 pgs.

"D2D synchronization signal design", 3GPP TSG-RAN WG1#76bis R1-141541, (Apr. 4, 2014), 4 pgs.

"Remaining details of D2D synchronization signals", 3GPP TSG-RAN WG1#78 R1-142843, (Aug. 21, 2014), 19 pgs.

"Discussion on D2DSS Design", Samsung, 3GPP TSG-RAN WG1#78 R1-143098, (Aug. 22, 2014), 6 pgs.

"European Application Serial No. 15844164.2, Extended European Search Report dated Apr. 20, 2018", 9 pgs.

"Japanese Application Serial No. 2017-514836, Examiners Decision of Final Refusal dated Aug. 14, 2018", W/English Translation, 10 pgs.

"Japanese Application Serial No. 2017-514836, Response filed May 15, 2005 to Office Action dated Feb. 20, 2018", w/ English claims, 18 pgs.

* cited by examiner

USER EQUIPMENT AND SYNCHRONIZATION METHODS FOR DEVICE TO DEVICE (D2D) COMMUNICATION

PRIORITY CLAIM

This application is a U.S. National Stage Filing under 35 U.S.C. 371 from International Application No, PCT/US2015/051857, filed Sep. 24, 2015 and published in English as WO 2016/049270 on Mar. 31, 2016, which claims priority to U.S. Provisional Patent Application Ser. No. 62/055,586, filed Sep. 25, 2014, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to device to device (D2D) communication. Some embodiments relate to synchronization for D2D communication.

BACKGROUND

A wireless network may support communication with mobile devices. In some cases, demand for data throughput for the mobile devices may be high and may even exceed an available system throughput for the network. As an example, the network may support mobile devices located in relatively close proximity to each other, some of which may exchange data with each other through the network. The network may become congested or overloaded in some cases, such as when the number of mobile devices supported becomes large. In some cases, mobile devices may lose network coverage. Accordingly, there is a general need for methods and systems of enabling communication for the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
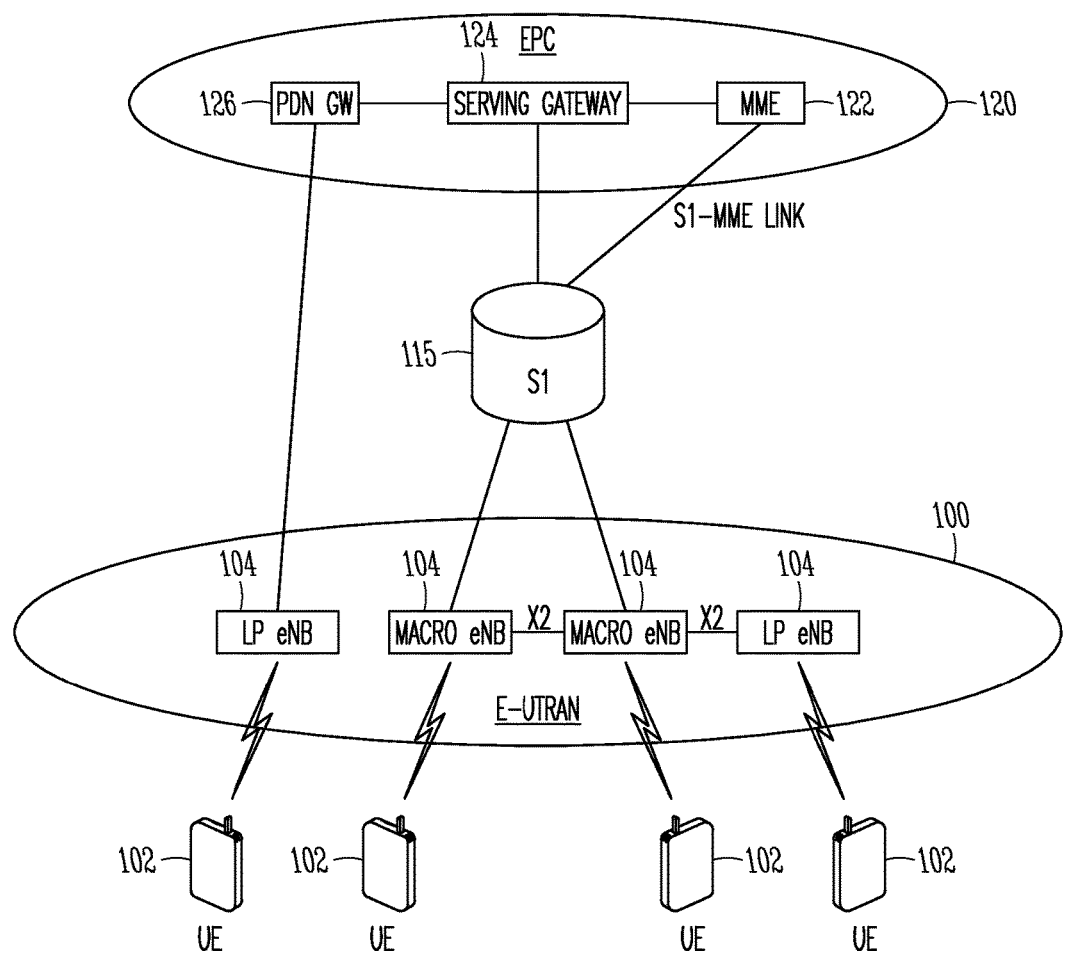
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the UE 102 may receive, from the eNB 104, a primary synchronization signal (PSS) that is based on one or more PSS symbol sequences. The UE 102 may transmit, to a second UE 102, a primary device-to-device synchronization signal (PD2DSS) for a device-to-device (D2D) communication session between the UE 102 and the second UE 102. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro, micro and femto) terminate the air interface protocol and may be the first point of contact for a UE 102. In some embodiments, an eNB 104 may fulfill various logical functions for the RAN 100 including but not limited to RNC (radio network controller functions) such as radio bearer management, uplink, downlink, and sidelink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers. In some embodiments, OFDM communication signals may be used in the downlink (eNB 104 to UE 102) and single-carrier frequency division multiple access (SC-FDMA) communication signals may be used in the uplink (UE 102 to eNB 104).

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
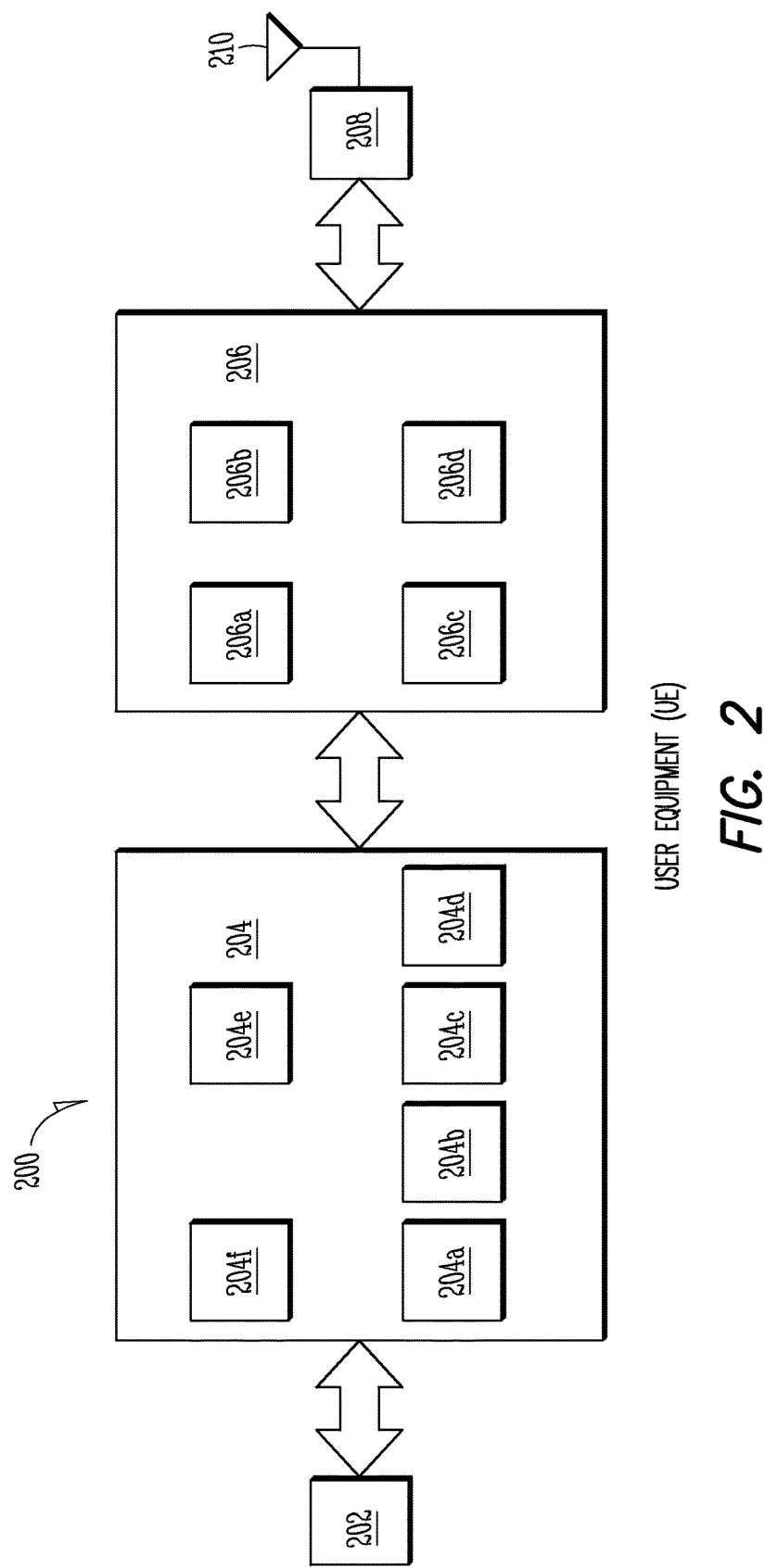
FIG. 2 is a block diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and one or more antennas 210, coupled together at least as shown. In some embodiments, other circuitry or arrangements may include one or more elements and/or components of the application circuitry 202, the baseband circuitry 204, the RF circuitry 206 and/or the FEM circuitry 208, and may also include other elements and/or components in some cases. As an example, "processing circuitry" may include one or more elements and/or components, some or all of which may be included in the application circuitry 202 and/or the baseband circuitry 204. As another example, "transceiver circuitry" may include one or more elements and/or components, some or all of which may be included in the RF circuitry 206 and/or the FEM circuitry 208. These examples are not limiting, however, as the processing circuitry and/or the transceiver circuitry may also include other elements and/or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLo). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, and/or input/output (I/O) interface.

Figure 3:
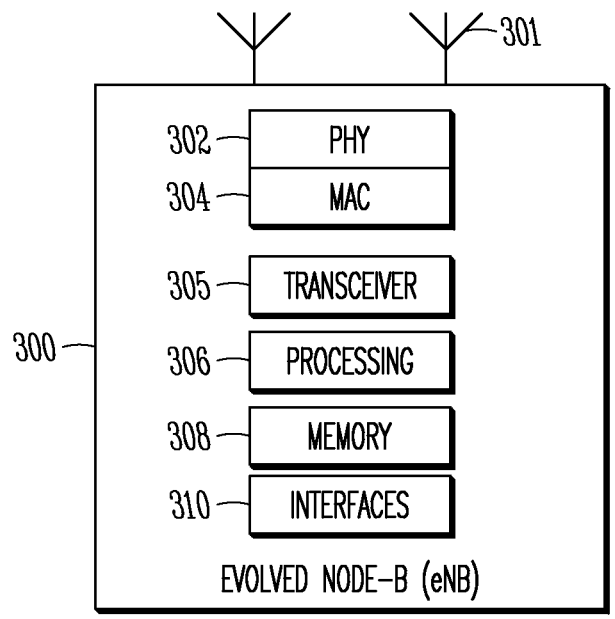
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210, 301 may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 and/or eNB 300 may include various components of the UE 200 and/or the eNB 300 as shown in FIGS. 2-3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

In accordance with embodiments, the UE 102 may determine a network reference timing based on a reception of a primary synchronization signal (PSS) from the eNB 104. The UE 102 may transmit a primary device-to-device synchronization signal (PD2DSS) to a second UE 102 according to the determined network reference timing. The PD2DSS may be configured to enable synchronization for a device-to-device (D2D) communication session between the UE 102 and the second UE 102. In some embodiments, the PD2DSS may be based on multiple PD2DSS symbol sequences, which may be different than PSS symbol sequences used for the PSS. In some embodiments, different Zadoff-Chu (ZC) sequences may be used for the PD2DSS and for the PSS. These embodiments are described in more detail below.

Figure 4:
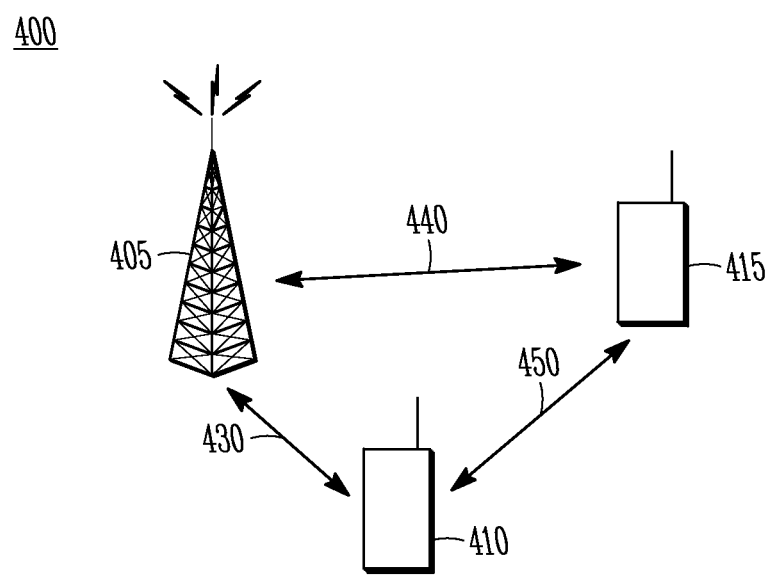
FIG. 4 illustrates an example of a scenario in which UEs may be in communication with an eNB and with each other in accordance with some embodiments.

FIG. 4 illustrates an example of a scenario in which UEs may be in communication with an eNB and with each other in accordance with some embodiments. Although the example scenario 400 shown in FIG. 4 may illustrate some aspects of techniques disclosed herein, it is understood that embodiments are not limited to this example scenario 400. The eNB 405 may be in communication with one or more UEs 410, 415 as part of in-network communication sessions over the links 430 and 440, respectively. The eNB 405 may be an eNB 104 while the UEs 410, 415 may be UEs 102, and the in-network communication sessions may take place over a network such as 100. Techniques and scenarios discussed are not limited to the number or types of eNBs and UEs shown in the example scenario 400, as any suitable number or types may be used. For instance, the eNB 405 is not limited to the tower configuration shown.

In addition to the in-network communication sessions that may be supported by the UEs 410, 415, direct connections between the UEs 410, 415 or other UEs may also be supported. Such communication may be referred to as device-to-device (D2D) communication in some cases. For instance, a D2D communication session between the UEs 410, 415 may take place over the link 450. In some embodiments, D2D communication sessions may be at least partly established through exchanging of control messages and/or other messages between the UEs 410, 415 and the eNB 405. In some cases, in-network and D2D communication sessions may take place simultaneously, but may occur exclusively in other cases.

In some embodiments, time resources, such as time transmission intervals (TTIs) or other time periods, may be reserved for operations used for D2D communication. In addition, channel resources (or frequency resources) may also be reserved in some embodiments, including one or more channels, sub-channels, sub-carriers, resource elements (REs), resource blocks (RBs) or other frequency unit. As an example, time resources and/or channel resources may be reserved by a network such as 100 for exchanging of D2D control messages between UEs 102. As another example, time resources and/or channel resources may be reserved by the network for exchanging of data payloads messages between the UEs 102. Examples of such will be described below.

As an example, a D2D transmission may use multiple TTIs for transmission of one or more data packets. Accordingly, a data packet may be processed using any number of transmitter functions, including but not limited to forward error correction (FEC), scrambling, interleaving and/or bit-to-symbol mapping to produce a group of symbols. The group of symbols may be mapped to the multiple TTIs using any suitable technique such as interleaving, interlacing, repetition and/or others. In addition, a combination of such techniques may also be used to map the group of symbols to the multiple TTIs.

Figure 5:
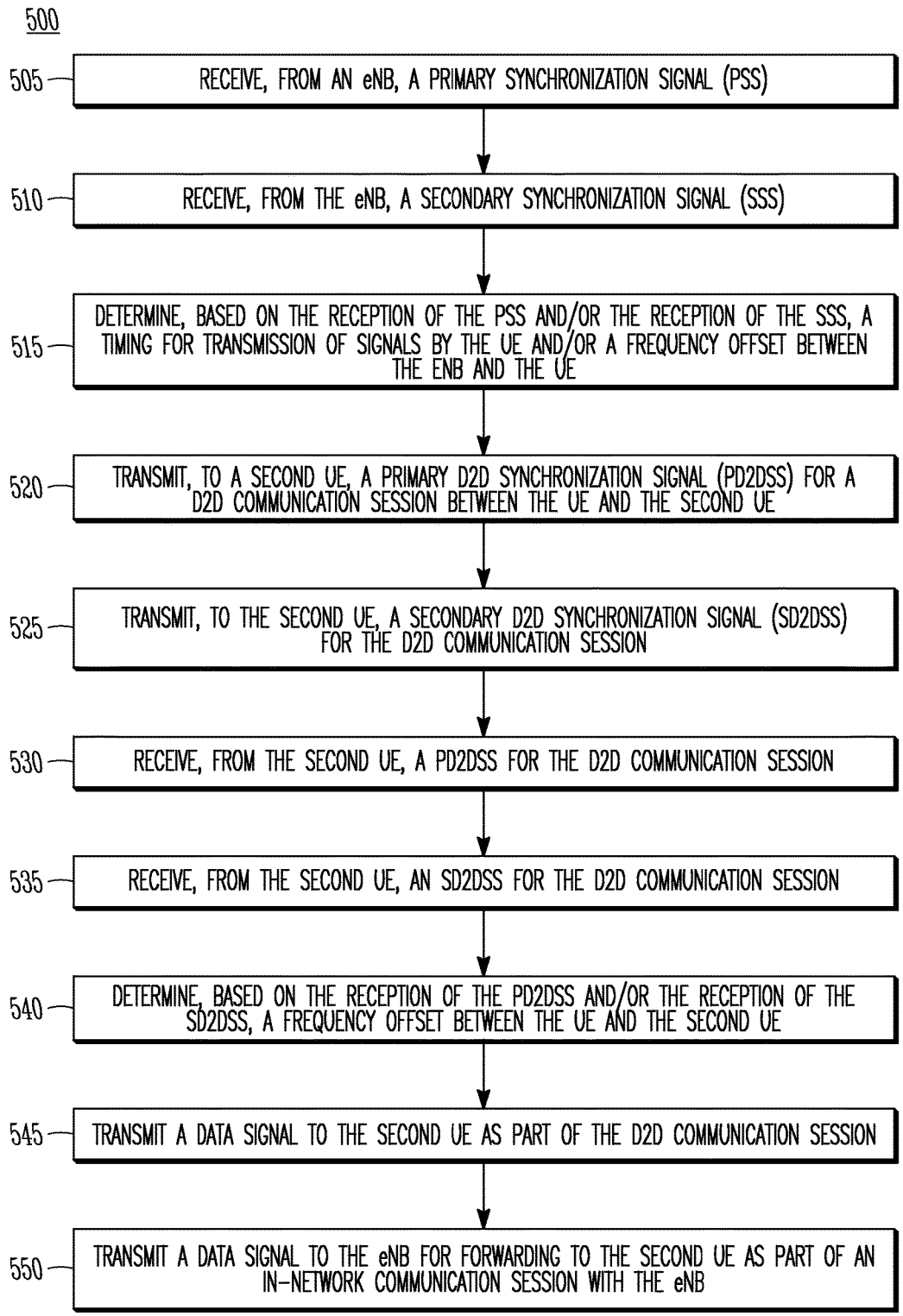
FIG. 5 illustrates the operation of a method of device-to-device (D2D) communication in accordance with some embodiments.

FIG. 5 illustrates the operation of a method of device-to-device (D2D) communication in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-8, although it is understood that the method 500 may be practiced with any other suitable systems, interfaces and components.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). In addition, the method 500 and other methods described herein may be practiced by wireless devices configured to operate in other suitable types of wireless communication systems, including systems configured to operate according to various IEEE standards such as IEEE 802.11. The method 500 may also refer to an apparatus for a UE 102 and/or eNB 104 or other device described above.

At operation 505 of the method 500, the UE 102 may receive, from an eNB 104 configured to operate in a network, a primary synchronization signal (PSS). The UE 102 may receive a secondary synchronization signal (SSS) from the eNB 104 at operation 510. At operation 515, the UE 102 may determine, based on the reception of the PSS and/or the reception of the SSS, a network reference timing and/or a frequency offset between the eNB 104 and the UE 102. As an example, the network reference timing may be used for transmission and/or reception of signals by the UE 102. For instance, a starting time, ending time, reference time, system time or other time for a frame, symbol or other time period may be used. In some embodiments, the UE 102 may receive one or more PSS to enable a determination of a coarse timing and/or a coarse frequency offset. As an example, the coarse timing may be an estimate of the network reference timing or other timing. The UE 102 may receive one or more SSS to further determine (or refine) the coarse timing and/or the coarse frequency offset. These embodiments are not limiting, however.

In some embodiments, the UE 102 may receive one or more control messages that may indicate time resources and/or channel resources (frequency resources) that may be reserved for D2D communication. As an example, a group of D2D TTIs may be indicated. As another example, a group of resource elements (REs) and/or resource blocks (RBs) may be indicated. In some embodiments, the messages may include radio resource control (RRC) messages or other messages. As an example, information related to the D2D communication, such as the time resources and/or channel resources, may be indicated in one or more control messages that are not necessarily dedicated for the D2D communication. That is, the messages may include other parameters and/or information that may not necessarily be related to the D2D communication.

At operation 520 of the method 500, the UE 102 may transmit, to a second UE 102, a primary D2D synchronization signal (PD2DSS) for a D2D communication session between the UE 102 and the second UE 102. At operation 525, the UE 102 may transmit a secondary D2D synchronization signal (SD2DSS) to the second UE 102 for the D2D communication session. In some embodiments, operations 520 and/or 525 may be performed when the UE 102 initiates or establishes the D2D communication session, although the scope of embodiments is not limited in this respect.

At operation 530 of the method 500, the UE 102 may receive, from the second UE 102, a primary D2D synchronization signal (PD2DSS) for the D2D communication session between the UE 102 and the second UE 102. At operation 535, the UE 102 may receive a secondary D2D synchronization signal (SD2DSS) from the second UE 102 for the D2D communication session. In some embodiments, operations 530 and/or 535 may be performed when the second UE 102 initiates or establishes the D2D communication session, although the scope of embodiments is not limited in this respect.

As previously described, some embodiments of the method 500 may not necessarily include all operations shown in FIG. 5. In some embodiments, when the UE 102 initiates and/or establishes the D2D communication session, the method 500 may include operations 520 and/or 525, and may exclude operations 530 and 535. In some embodiments, when the second UE 102 initiates and/or establishes the D2D communication session, the method 500 may include operations 530 and/or 535, and may exclude operations 520 and 525. These embodiments are not limiting, however, as some embodiments may include any or all of operations 520-535.

In some embodiments, the D2D communication session may be an in-coverage D2D communication session. Accordingly, transmission and reception timing for the D2D communication session may be based on a timing of the network, such as the network reference timing described previously. For instance, the UEs 102 may be synchronized to the network reference timing and may transmit and receive the PD2DSS, SD2DSS and/or other signals based on the network reference timing. In such cases, the PD2DSS may be an "in-coverage PD2DSS."

In some embodiments, the D2D communication session may be an out-of-coverage D2D communication session. Accordingly, transmission and reception timing for the D2D communication session may be asynchronous to timing used by the network, such as the network reference timing described previously. For instance, the UEs 102 may transmit and receive the PD2DSS, SD2DSS and/or other signals asynchronous to the network reference timing. In such cases, the PD2DSS may be an "out-of-coverage PD2DSS."

In some embodiments, one or more sequences may be used for the in-coverage PD2DSS, out-of-coverage PD2DSS, and/or the PSS. As an example, the in-coverage PD2DSS and the out-of-coverage PD2DSS may be different. As an example, the in-coverage PD2DSS and the out-of-coverage PD2DSS may be the same. That is, a PD2DSS may be used that is not necessarily based on whether the D2D communication session is an in-coverage or an out-of-coverage session. As another example, the in-coverage PD2DSS and/or the out-of-coverage PD2DSS may be different from the PSS. As another example, a group of candidate sequences may be available for selection for the the in-coverage PD2DSS, out-of-coverage PD2DSS, and/or the PSS.

In some embodiments, the PD2DSS may include a synchronization signal type indicator. For instance, the indicator may indicate whether the PD2DSS is the in-coverage PD2DSS or the out-of-coverage PD2DSS. In some embodiments, the PD2DSS may include a synchronization hop count or other parameters or information related to frequency hopping. These embodiments are not limiting, however, as the PD2DSS may also include other parameters or information that may or may not necessarily be related to the D2D communication session. For instance, control information for the PD2DSS, such as a block size or modulation format used by the PD2DSS, may also be included in some cases.

It should be noted that reference may be made to an in-coverage PD2DSS and an out-of-coverage PD2DSS, but such reference are not limiting. Some or all of the techniques and operations described herein for determination and/or usage of an in-coverage PD2DSS and an out-of-coverage PD2DSS may also be applicable to a determination and/or usage of multiple PD2DSSs. The usage of such multiple PD2DSSs may or may not necessarily be related to whether or not the UE 102 is in coverage or out of coverage, in some cases. For example, techniques used for the in-coverage PD2DSS and the out-of-coverage PD2DSS may also be used for a first PD2DSS and second PD2DSS in some cases. In some embodiments, the PD2DSS may indicate whether the PD2DSS is the first or the second PD2DSS.

It should also be noted that the discussion regarding the PD2DSS may also be applicable to the SD2DSS in some cases. As an example, an in-coverage SD2DSS and an out-of-coverage SD2DSS may be used, and may be the same or may be different. In addition, either or both of these SD2DSS may be the same or may be different from the SSS.

At operation 540, the UE 102 may determine, based on the reception of the PD2DSS and/or the reception of the SD2DSS, a frequency offset between the UE 102 and the second UE 102. As an example, the reception of the PD2DSS and/or SD2DSS may be performed according to a network frequency offset between the UE 102 and the eNB 104. For instance, the UE 102 may adjust an operating frequency for the reception of the PD2DSS and/or SD2DSS based on the network frequency offset. Accordingly, a D2D frequency offset, which may or may not be the same as the network frequency offset, may be determined and may be used for the D2D communication session. As an example, the D2D frequency offset may be a frequency offset with respect to the network frequency offset.

It should be noted that in some embodiments, a frequency offset at the eNB 104 may be significantly lower than an expected frequency offset at the UE 102. For instance, design of the UE 102 may be constrained or restricted by factors such as cost, device size, quality of components or other, some or all of which may not necessarily be applicable to the eNB 104. As an example, the eNB 104 may operate with a frequency error that may be up to 0.1 ppm (parts per million) while the UE 102 may operate with a frequency error that may be up to 10 ppm. In addition, frequency errors between the UE 102 and the second UE 102 may be up to 20 ppm in some cases. Accordingly, for an example 2 GHz carrier frequency, a frequency error between the UE 102 and the second UE 102 may be up to 40 kHz.

In addition, the UE 102 may determine a D2D timing for the D2D communication session with the second UE 102 based on the reception of the PD2DSS and/or the reception of the SD2DSS in some cases. As an example, the PD2DSS and/or SD2DSS may be received according to the network reference timing or other timing, such as the timing determined at operation 515, and the D2D timing may be determined as part of the reception. The D2D timing may or may not be different than the network reference timing. In some cases, the D2D timing may be similar to the network reference timing, but may be different based on factors such as locations of the second UE 102 and eNB 104 with respect to the UE 102. For instance, a propagation delay between the UE 102 and the eNB 104 may be different from a propagation delay between the UE 102 and the second UE 102.

At operation 545, the UE 102 may transmit a data signal to the second UE 102 as part of the D2D communication session. In some embodiments, the data signal may be transmitted according to the determined D2D frequency offset and/or the determined D2D timing. As a non-limiting example, the data signal may be transmitted to the second UE 102 as part of the D2D communication session when network coverage is unavailable for the UE 102. For instance, the UE 102 may be unable to communicate with the eNB 104 and/or other eNBs 104 due to location, traffic, congestion or other factors. As another non-limiting example, the UE 102 may exchange data signals with the second UE 102 even while network coverage is available to the UE 102.

At operation 550, the UE 102 may transmit a data signal to the eNB 104 as part of an in-network communication session with the eNB 104. As an example, the data signal may be intended for the second UE 102, and may be transmitted to the eNB 104 for forwarding to the second UE 102 by the eNB 104. That is, the UE 102 may send the data signal to the second UE 102 as part of in-network communication in some cases. It should be noted that embodiments are not limited to exclusive usage of either D2D communication or in-network communication by the UE 102 and the second UE 102. In some embodiments, a combination of D2D communication and in-network communication may be used.

In some embodiments, the PD2DSS signal may be based on one or more PD2DSS symbol sequences. As a non-limiting example, one or more Zadoff-Chu (ZC) sequences may be used. For instance, for a ZC index u, PD2DSS sequences of length 62 may be determined as $\exp(-j*pi*u*n*(n+1)/63))$ for the index n in a range of 0, 1, . . . , 30 and may be determined as $\exp(-j*pi*u*(n+1)*(n+2)/63))$ for the index n in a range of 31, 32, . . . 61.

It should be noted that other sequence lengths may be used in some cases. In addition, puncturing may be used in some cases to reduce a ZC sequence length to a desired sequence length. As an example, ZC sequences of length 73 may be reduced to sequences of length 72 via puncturing, and the punctured sequences of length 72 may be used. For instance, when six resource blocks (RBs) of 12 REs each are used, the length 72 sequences may be applicable.

This example is not limiting, however, as other sequences may be used. As an example, binary phase-shift keying (BPSK) or quadrature phase-shift keying (QPSK) sequences may be used, and may be selected based on ambiguity functions and/or correlation functions of the sequences. The selection may be based, in some cases, on such functions over a frequency range such as the 40 kHz range described earlier. For instance, a desirable auto-correlation function for the sequence may include a large peak for time values and/or frequency shift values at or near zero, and may exclude large side-lobes. Such auto-correlation functions may be simulated and examined a-priori in the presence of frequency offsets as part of a design process.

In some embodiments, the PD2DSS may be transmitted in channel resources that may be allocated for and/or reserved for the D2D communication. Such channel resources may include any number of resource elements (REs), resource blocks (RBs) or other allocation in frequency. As an example, a group of D2D REs may be allocated for the D2D communication, and the ZC sequence or other sequence may be mapped to at least a portion of the D2D REs according to a predetermined mapping. A Fourier Transform (FT) operation may be performed on a group of REs that may include the D2D REs. It should be noted that the FT operation may include any suitable FT function, including but not limited to a Discrete Fourier Transform (DFT), an Inverse Discrete Fourier Transform (IDFT), a Fast Fourier Transform (FFT), an Inverse Fast Fourier Transform (IFFT) or other.

The group of REs on which the FT operation may be performed may also include other REs in some cases, such as guard-band REs and/or a direct current (DC) RE, for which predetermined symbol values (such as 0.0) may be used for the FT operation. In some cases, the group of REs on which the FT may be performed may also include other REs allocated for purposes other than D2D communication (such as in-network communication or other) and/or REs that may be unused or reserved. For instance, a PD2DSS symbol sequence of length 62 may be mapped to a predetermined group of 62 REs of a group of 128 REs, and the FT operation may be performed on the group of 128 REs.

In some embodiments, the PD2DSS may include one or more PD2DSS portions. As an example, the PD2DSS may include a first PD2DSS portion based on an FT of a first PD2DSS symbol sequence and may further include a second PD2DSS portion based on an FT of a second PD2DSS symbol sequence. The first PD2DSS symbol sequence may be or may include a first PD2DSS ZC sequence that may be based on a first PD2DSS ZC index. The second PD2DSS symbol sequence may be or may include a second PD2DSS ZC sequence that may be based on a second PD2DSS ZC index. In some embodiments, the first PD2DSS ZC sequence may be mapped, according to a predetermined mapping, to the D2D REs for the FT of the first PD2DSS sequence. The second PD2DSS ZC sequence may be mapped to the D2D REs according to the predetermined mapping for the FT of the second PD2DSS sequence.

Although embodiments are not limited as such, the first and second PD2DSS ZC indexes may be different in some cases. Accordingly, the first and second PD2DSS ZC sequences may be different and the first and second PD2DSS portions may be different in such cases. As an example, the first PD2DSS ZC sequence may be based on a first PD2DSS ZC index and the second PD2DSS ZC sequence may be based on a complex conjugation of the first PD2DSS ZC sequence. In some cases, the first and second PD2DSS ZC indexes may be designed or selected based on one or more ambiguity functions for the first and second PD2DSS ZC sequences in a particular range of frequency offset, such as the 40 kHz range described previously.

In some embodiments, the in-coverage PD2DSS and/or the out-of-coverage PD2DSS may each include multiple portions, such as a first portion and a second portion. As an example, the first portion of the in-coverage PD2DSS may be based on an FT of a first ZC sequence and the second portion of the in-coverage PD2DSS may be based on an FT of a second ZC sequence. The first portion of the out-of-coverage PD2DSS may include a complex conjugation of the first portion of the in-coverage PD2DSS. The second portion of the out-of-coverage PD2DSS may include a complex conjugation of the second portion of the in-coverage PD2DSS.

In some embodiments, the first PD2DSS portion may be transmitted during a first time period and the second PD2DSS portion may be transmitted during a second time period. As an example, the first and second PD2DSS portions may be transmitted according to a predetermined time difference. That is, transmission times for the first and second PD2DSS portions may be separated by a predetermined time difference. As a non-limiting example, a separation of five milliseconds may be used, although embodiments are not limited as such. Such a time difference may be included as part of a 3GPP LTE standard or other standard, although embodiments are not limited as such.

The PD2DSS portions transmitted during each of the first and second time periods may be based on FTs of sequences, such as the ZC sequences or other sequences, and may be formed using techniques previously described. For instance, the mapping of the sequences to REs in a predetermined manner may be performed for each of the PD2DSS portions.

In some embodiments, the reception of the PD2DSS may include determination of a first partial correlation and a second partial correlation. Accordingly, a D2D frequency offset may be determined based on a phase difference for the partial correlations or other related information.

In some embodiments, the PSS may use similar techniques described herein for the PD2DSS. As an example, one or more FT operations may be performed on one or more PSS symbol sequences to form one or more PSS portions. In some embodiments, the PSS may include first and second PSS portions that may be based on an FT of a same PSS symbol sequence. The first and second PSS portions may be transmitted according to a predetermined time spacing, which may or may not be the same as the predetermined time spacing used for the PD2DSS.

As an example, the PSS symbol sequence may include or may be based on a PSS ZC sequence, which may be based on a PSS ZC index. A first portion of the PD2DSS may be based on a first PD2DSS ZC sequence, which may be based on a first PD2DSS ZC index. A second portion of the PD2DSS may be based on a second PD2DSS ZC sequence, which may be based on a second PD2DSS ZC index. The PSS ZC index, the first PD2DSS ZC index, and the second PD2DSS ZC index may be different in some cases.

These embodiments are not limiting, however, as the PSS may include first and second PSS portions that may be based on FTs of different PSS symbol sequences in some embodiments. That is, the first PSS portion may be based on a first PSS symbol sequence and the second PSS portion may be based on a second, different PSS sequence. Although not limited as such, some or all of the techniques used for generation of the PD2DSS described herein may be used for generation of the PSS in some embodiments.

Several non-limiting examples will be given for determination of the PSS and/or PD2DSS based on particular ZC sequences and/or ZC indexes. In some cases, such examples may be based on simulation results such as auto-correlations, ambiguity functions or other, which may be performed over frequency offset ranges such as those previously described. In some cases, the examples may be based on values used in 3GPP LTE standards or other standards. It should be noted that particular values of ZC indexes and/or pairs of ZC indexes given in these examples are not limiting. Some or all of the techniques described herein may be practiced using other values of ZC indexes and/or pairs of ZC indexes in some cases. As an example, the particular values presented in these examples may be selected based on results for auto-correlation functions, ambiguity functions or other simulation results.

As an example, the PSS may use ZC indexes of 25, 29, and 34. That is, three candidate PSS may be available, and the particular PSS used may depend on a cell ID or other factor.

As another example, one or more particular ZC indexes for which a time shift of an ambiguity peak may be minimized (or at least relatively low) may be used for the PD2DSS. In some cases, a first ZC index may be selected for usage in the first PD2DSS portion based at least partly on a timing tolerance of a first partial correlation with respect to a particular window or time period. For instance, an orthogonal frequency division multiplexing (OFDM) cyclic prefix (CP) time interval may be used, and the first ZC index may be selected such that the timing tolerance is within the CP for a range of frequency offsets (such as +/−40 kHz or other range). As an example, ZC sequences of length 63 that use the ZC indexes of 1 or 62 may be used based at least partly on these or other criteria. In addition, ZC sequences of length 73 that use the ZC indexes of 1 or 72 may also be used based at least partly on these or other criteria in some cases.

As another example, when a PD2DSS sequence length of 62 is used, ZC indexes of 1 or 62 may be used for the first PD2DSS portion and a different ZC index may be used for the second PD2DSS portion. For instance, ZC indexes of 53, 52, 41, or 37 may be used for the second PD2DSS portion when the ZC index of 1 is used for the first PD2DSS portion. When the ZC index of 62 is used for the first PD2DSS portion, ZC indexes of 10, 11, 22, or 26 may be used for the second PD2DSS portion.

As another example, when a PD2DSS sequence length of 72 is used, ZC indexes of 1 or 72 may be used for the first PD2DSS portion and a different ZC index may be used for the second PD2DSS portion. For instance, ZC indexes of 72, 8, 49, or 41 may be used for the second PD2DSS portion when the ZC index of 1 is used for the first PD2DSS portion. When the ZC index of 72 is used for the first PD2DSS portion, ZC indexes of 1, 65, 24, or 32 may be used for the second PD2DSS portion.

As another example, the second PD2DSS portion may include a complex conjugation of the first PD2DSS portion. When a PD2DSS sequence length of 62 is used, the following pairs of ZC indexes may be used for the first and second PD2DSS portions—(26, 37), (10, 53), (11, 52), (22, 41) or (23, 40). When a PD2DSS sequence length of 72 is used, the following pairs of ZC indexes may be used for the first and second PD2DSS portions—(1, 72), (8, 65), (24, 49), (30, 43) or (32, 41). As another example, a pair of ZC indexes (such as those given above) may be used for the in-coverage PD2DSS and a reverse of the pair of ZC indexes may be used for the out-of-coverage PD2DSS. For instance, the pair (26, 37) may be used for the in-coverage PD2DSS and the pair (37, 26) may be used for the out-of-coverage PD2DSS.

As another example, first portions of the in-coverage PD2DSS and the out-of-coverage PD2DSS may be related by conjugation and second portions of the in-coverage PD2DSS and the out-of-coverage PD2DSS may be related by conjugation. In one arrangement, the first pair of ZC indexes (10, 37) may be used for the in-coverage PD2DSS and the second pair of ZC indexes (53, 26) may be used for the out-of-coverage PD2DSS. Accordingly, the ZC indexes 10 and 53 may be conjugates and the ZC indexes 37 and 26 may be conjugates. In another arrangement, the first pair of ZC indexes (22, 37) may be used for the in-coverage PD2DSS and the second pair of ZC indexes (41, 26) may be used for the out-of-coverage PD2DSS. In another arrangement, the first pair of ZC indexes (10, 41) may be used for the in-coverage PD2DSS and the second pair of ZC indexes (53, 22) may be used for the out-of-coverage PD2DSS. In another arrangement, the first pair of ZC indexes (1, 53) may be used for the in-coverage PD2DSS and the second pair of ZC indexes (62, 10) may be used for the out-of-coverage PD2DSS. In another arrangement, the first pair of ZC indexes (11, 22) may be used for the in-coverage PD2DSS and the second pair of ZC indexes (52, 41) may be used for the out-of-coverage PD2DSS. In another arrangement, the first pair of ZC indexes (11, 26) may be used for the in-coverage PD2DSS and the second pair of ZC indexes (52, 37) may be used for the out-of-coverage PD2DSS.

In some embodiments, the SSS may include one or more sequences that may be interleaved and/or concatenated. For instance, two m-sequences of length 31 may be concatenated into a concatenated sequence. The concatenated sequence may be scrambled with one or more scrambling sequences, which may be based on a cell ID, in some cases. As an example, the scrambling may be applied to a portion of the concatenated sequence, such as odd elements. In some embodiments, the SD2DSS may be determined using similar techniques. For instance, the scrambling of the SSS may be omitted for the SD2DSS.

Figure 6:
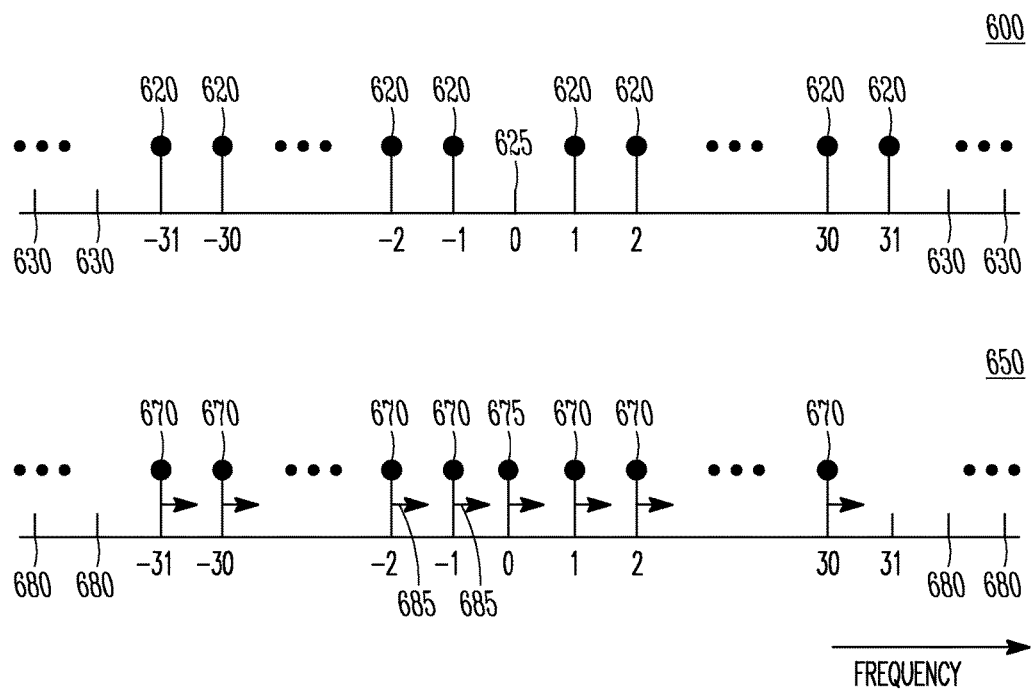
FIG. 6 illustrates an example of an orthogonal frequency division multiplexing (OFDM) arrangement and an example of a single carrier frequency division multiplexing (SC-FDM) arrangement in accordance with some embodiments.

FIG. 6 illustrates an example of an orthogonal frequency division multiplexing (OFDM) arrangement and an example of a single carrier frequency division multiplexing (SC-FDM) arrangement in accordance with some embodiments. It should be noted that embodiments are not limited by the examples 600 and 650 shown in FIG. 6, in terms of the number or arrangement of used REs.

The example scenario 600 illustrates OFDM transmission for a sequence, such as a reduced ZC sequence or other, of length 62. In this example, the DC RE 625 is unoccupied, while the REs 620 are occupied by a symbol. In addition, the REs 630 may include any number of guard REs 630 and/or other REs 630 occupied for other communication (which may or may not be related to D2D communication). For instance, an FT operation on 128 REs may be used, in which case REs 630 indexed between −64 and −32 and between 32 and 63 may include such guard REs 630 and/or other REs 630.

The example scenario 650 illustrates SC-FDMA transmission for a sequence, such as a reduced ZC sequence or other, of length 62. In this example, the DC RE 675 and the REs 670 are occupied by symbols. As indicated by the arrow 685, sub-carriers for the REs 670, 675 may be shifted by a half sub-carrier with respect to the DC RE 675. In addition, the REs 680 may include any number of guard REs 680 and/or other REs 680 occupied for other communication (which may or may not be related to D2D communication). For instance, an FT operation on 128 REs may be used, in which case REs 680 indexed between −64 and −32 and between 31 and 63 may include such guard REs 680 and/or other REs 680.

Figure 7:
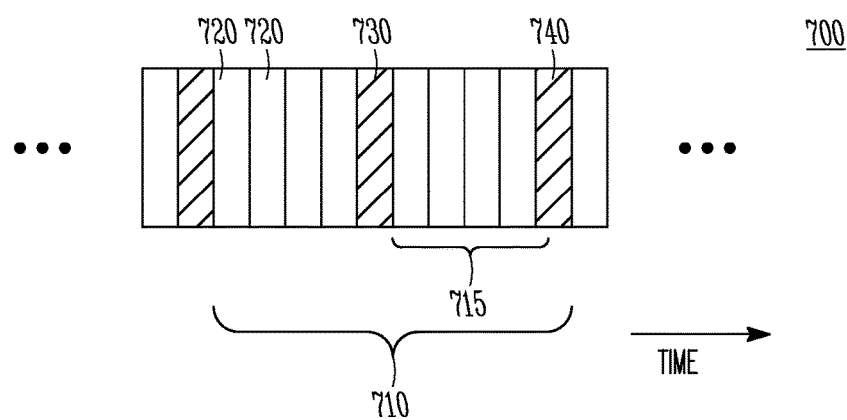
FIG. 7 illustrates an example of an allocation of time resources for synchronization signals in accordance with some embodiments.

FIG. 7 illustrates an example of an allocation of time resources for synchronization signals in accordance with some embodiments. It should be noted that embodiments are not limited by the example 700 shown in FIG. 7, in terms of the number or arrangement of time intervals used for the synchronization signals. In the non-limiting example scenario 700, a first portion 730 and a second portion 740 of the PD2DSS may be used. The frame 710 may include multiple time slots 720, and the PD2DSS may be transmitted in a portion of the time slots 720. A predetermined separation 715 may be used between the first portion 730 and the second portion 740. As a non-limiting example, the frame 710 may be an LTE frame of 10 milliseconds and the time slots 720 may be LTE time transmission intervals (TTIs) of one millisecond.

Figure 8:
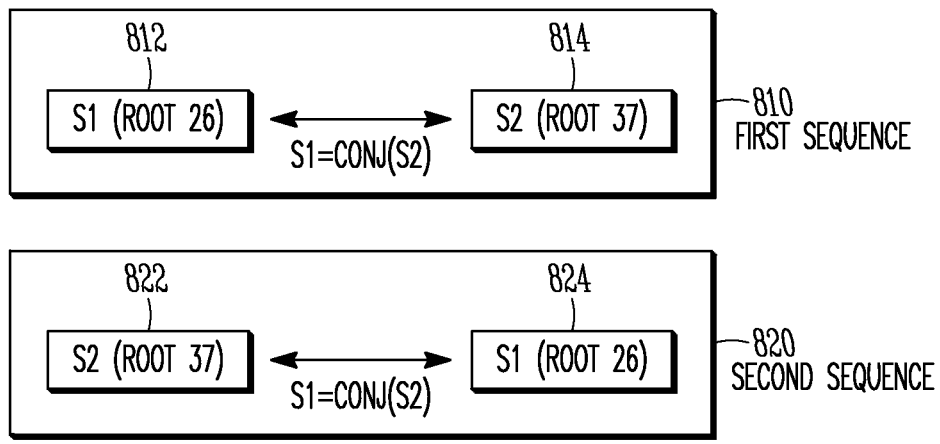
FIG. 8 illustrates examples of synchronization signals in accordance with some embodiments.
Figure 8:
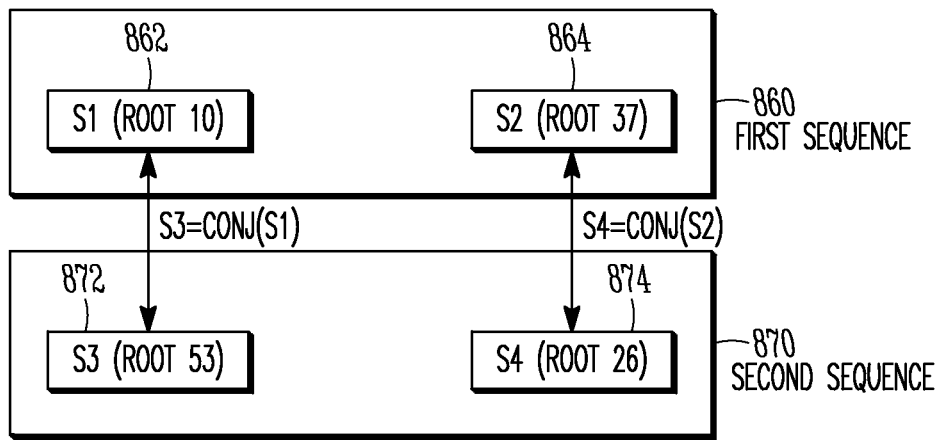

FIG. 8 illustrates examples of synchronization signals in accordance with some embodiments. It should be noted that embodiments are not limited by the examples 800, 850 shown in FIG. 8, in terms of the number or arrangement of sequences used for the synchronization signals. In addition, embodiments are not limited by the example relationships shown in FIG. 8, such as the conjugation relationship.

In the non-limiting example scenario 800, a first PD2DSS 810 may include a first portion 812 that may be based on a ZC index of 26 and may further include a second portion 814 that may be based on a ZC index of 37. The indexes 26 and 37 may be conjugate indexes for the ZC sequences. In addition, the second PD2DSS 820 may include a first portion 822 that may be based on the ZC index of 37 and may further include a second portion 824 that may be based on the ZC index of 26. As previously described, the indexes 26 and 37 may be conjugate indexes for the ZC sequences. It should be noted that the first PD2DSS 810 and the second PD2DSS 820 may be different sequences in this example scenario 800, as shown in FIG. 8.

As a non-limiting example, the first PD2DSS 810 may be an in-coverage PD2DSS that may be used when the UE 102 is in network coverage and the second PD2DSS 820 may be an out-of-coverage PD2DSS that may be used when the UE 102 is out of network coverage. This example is not limiting, however, as the first PD2DSS 810 and the second PD2DSS 820 may be used for other purposes and/or scenarios. As another non-limiting example, the transmitted PD2DSS may be selected, by the UE 102, from either the first PD2DSS 810 or the second PD2DSS 820. The selection of either of those two PD2DSS may represent or convey one bit of information to the second UE 102 (or other receiving device). In such cases, the second UE 102 may attempt to synchronize to both the first PD2DSS 810 and second PD2DSS 820.

In the non-limiting example scenario 850, a first PD2DSS 860 may include a first portion 862 that may be based on a ZC index of 10 and may further include a second portion 864 that may be based on a ZC index of 37. In addition, the second PD2DSS 870 may include a first portion 872 that may be based on the ZC index of 53, which may be a conjugate index for the ZC index of 10. The second PD2DSS 870 may further include a second portion 874 that may be based on the ZC index of 26, which may be a conjugate index for the ZC index of 37. It should be noted that the first PD2DSS 860 and the second PD2DSS 870 may be different sequences in this example scenario 850, as shown in FIG. 8.

As another non-limiting example, the first PD2DSS 860 may be an in-coverage PD2DSS that may be used when the UE 102 is in network coverage and the second PD2DSS 870 may be an out-of-coverage PD2DSS that may be used when the UE 102 is out of network coverage. This example is not limiting, however, as the first PD2DSS 860 and the second PD2DSS 870 may be used for other purposes and/or scenarios. As another non-limiting example, the transmitted PD2DSS may be selected, by the UE 102, from either the first PD2DSS 860 or the second PD2DSS 870, and the selection of either of those two PD2DSS may represent or convey one bit of information to the second UE 102 (or other receiving device). In such cases, the second UE 102 may attempt to synchronize to both the first PD2DSS 860 and second PD2DSS 870.

In Example 1, an apparatus for a User Equipment (UE) may comprise transceiver circuitry and hardware processing circuitry. The hardware processing circuitry may configure the transceiver circuitry to receive, from an Evolved Node-B (eNB) arranged to operate in a network, a primary synchronization signal (PSS) that is based on one or more PSS symbol sequences. The hardware processing circuitry may further configure the transceiver circuitry to transmit, to a second UE, a primary device-to-device synchronization signal (PD2DSS) for a device-to-device (D2D) communication session between the UE and the second UE. The PD2DSS may be based on one or more PD2DSS symbol sequences. The PD2DSS may be transmitted according to a network reference timing that is based at least partly on the reception of the PSS.

In Example 2, the subject matter of Example 1, wherein the PD2DSS may include a first PD2DSS portion based on a Fourier Transform (FT) of a first PD2DSS symbol sequence and may further include a second PD2DSS portion based on an FT of a second PD2DSS symbol sequence.

In Example 3, the subject matter of one or any combination of Examples 1-2, wherein transmission times for the first and second PD2DSS portions may be separated by a predetermined time difference.

In Example 4, the subject matter of one or any combination of Examples 1-3, wherein the PSS may include first and second PSS portions that are based on an FT of a same PSS symbol sequence.

In Example 5, the subject matter of one or any combination of Examples 1-4, wherein the PSS may include a first PSS portion that is based on an FT of a first PSS symbol sequence and a second PSS portion that is based on an FT of a second PSS symbol sequence.

In Example 6, the subject matter of one or any combination of Examples 1-5, wherein the first PD2DSS symbol sequence may include a first PD2DSS Zadoff-Chu (ZC) sequence that is based on a first PD2DSS ZC index, and the second PD2DSS symbol sequence may include a second PD2DSS ZC sequence that is based on a second PD2DSS ZC index.

In Example 7, the subject matter of one or any combination of Examples 1-6, wherein the PSS may include first and second PSS portions that are based on an FT of a PSS symbol sequence. The PSS symbol sequence may include a PSS ZC sequence that is based on a PSS ZC index. The PSS ZC index, the first PD2DSS ZC index, and the second PD2DSS ZC index may be different.

In Example 8, the subject matter of one or any combination of Examples 1-7, wherein the PD2DSS may be transmitted in channel resources that include a group of resource elements (REs). The first PD2DSS ZC sequence may be mapped, according to a predetermined mapping, to at least a portion of the REs for the FT of the first PD2DSS sequence. The second PD2DSS ZC sequence may be mapped, according to the predetermined mapping, to the REs for the FT of the second PD2DSS sequence.

In Example 9, the subject matter of one or any combination of Examples 1-8, wherein the first and second PD2DSS ZC indexes may be selected for usage in the first and second PD2DSS ZC sequences based at least partly on ambiguity functions for the first and second PD2DSS ZC sequences in a frequency offset range of at least 40 kHz.

In Example 10, the subject matter of one or any combination of Examples 1-9, wherein the first PD2DSS symbol sequence may include a first PD2DSS Zadoff-Chu (ZC) sequence that is based on a first PD2DSS ZC index. The second PD2DSS symbol sequence may include a second PD2DSS ZC sequence that is based on a complex conjugation of the first PD2DSS ZC sequence.

In Example 11, the subject matter of one or any combination of Examples 1-10, wherein when the D2D communication session is an in-coverage D2D communication session, the PD2DSS may be transmitted according to the network reference timing and the PD2DSS may be a first PD2DSS. When the D2D communication session is an out-of-coverage D2D communication session, the PD2DSS may be transmitted asynchronously to the network reference timing and the PD2DSS may be a second PD2DSS. The PD2DSS may include an indicator of whether the PD2DSS is the first PD2DSS or the second PD2DSS.

In Example 12, the subject matter of one or any combination of Examples 1-11, wherein a first portion of the first PD2DSS may be based on a Fourier Transform (FT) of a first Zadoff-Chu (ZC) sequence and a second portion of the first PD2DSS may be based on an FT of a second ZC sequence. A first portion of the second PD2DSS may include a complex conjugation of the first portion of the first PD2DSS. A second portion of the second PD2DSS may include a complex conjugation of the second portion of the first PD2DSS.

In Example 13, the subject matter of one or any combination of Examples 1-12, wherein the transmission of the PD2DSS may be configured to enable the second UE to determine a D2D frequency synchronization for the D2D communication session.

In Example 14, the subject matter of one or any combination of Examples 1-13, wherein the hardware processing circuitry may further configure the transceiver circuitry to transmit, to the second UE, a data signal as part of the D2D communication session.

In Example 15, the subject matter of one or any combination of Examples 1-14, wherein the data signal may be transmitted to the second UE when a network coverage for the UE is unavailable.

In Example 16, the subject matter of one or any combination of Examples 1-15, wherein the UE and the eNB may be configured to operate according to a Third Generation Partnership Project (3GPP) Long Term Evolution (LTE) protocol.

In Example 17, the subject matter of one or any combination of Examples 1-16, wherein the apparatus may further include one or more antennas coupled to the transceiver circuitry for the reception of the PSS and for the transmission of the PD2DSS.

In Example 18, a non-transitory computer-readable storage medium may store instructions for execution by one or more processors to perform operations for communication by a User Equipment (UE). The operations may configure the one or more processors to receive, from a second UE, a primary device-to-device synchronization signal (PD2DSS) for a device-to-device (D2D) communication with the second UE. The operations may further configure the one or more processors to determine a D2D frequency offset between the UE and the second UE based on a first partial correlation for a first PD2DSS portion and a second partial correlation for a second PD2DSS portion. The operations may further configure the one or more processors to transmit a D2D data signal to the second UE according to the determined D2D frequency offset. The reception of the PD2DSS and the transmission of the D2D data signal may be performed in D2D channel resources reserved for D2D communication between UEs.

In Example 19, the subject matter of Example 18, wherein the first PD2DSS portion may be based on a Fourier Transform (FT) of a first PD2DSS symbol sequence that includes a first PD2DSS Zadoff-Chu (ZC) sequence. The second PD2DSS portion may be based on an FT of a second PD2DSS symbol sequence that includes a second PD2DSS Zadoff-Chu (ZC) sequence.

In Example 20, the subject matter of one or any combination of Examples 18-19, wherein the second PD2DSS Zadoff-Chu (ZC) sequence may be based on a complex conjugation of the first PD2DSS Zadoff-Chu (ZC) sequence.

In Example 21, the subject matter of one or any combination of Examples 18-20, wherein the PD2DSS may be received in channel resources that include a group of D2D resource elements (REs) that are reserved for D2D communication. The first PD2DSS ZC sequence may be mapped, according to a predetermined mapping, to at least a portion of the D2D REs for the FT of the first PD2DSS sequence. The second PD2DSS ZC sequence may be mapped, according to the predetermined mapping, to the D2D REs for the FT of the second PD2DSS sequence.

In Example 22, the subject matter of one or any combination of Examples 18-21, wherein the first ZC sequence may be selected for usage in the first PD2DSS portion based at least partly on a timing tolerance of the first partial correlation with respect to an orthogonal frequency division multiplexing (OFDM) cyclic prefix time interval of the PD2DSS.

In Example 23, the subject matter of one or any combination of Examples 18-22, wherein the first partial correlation may be used to determine a D2D timing for the reception of the PD2DSS. The second partial correlation may be used to determine the D2D frequency offset.

In Example 24, the subject matter of one or any combination of Examples 18-23, wherein the timing tolerance may be determined for at least a 40 kHz range of frequency offset between the UE and the second UE.

In Example 25, the subject matter of one or any combination of Examples 18-24, wherein the operations may further configure the one or more processors to receive a primary synchronization signal (PSS) from an Evolved Node-B (eNB) arranged to operate in a network. The operations may further configure the one or more processors to determine an in-network frequency offset between the eNB and the UE based on the reception of the PSS. The operations may further configure the one or more processors to transmit an in-network data signal to the eNB according to the determined in-network frequency offset. The reception of the PSS and the transmission of the in-network data signal may be performed in network channel resources exclusive to the D2D channel resources.

In Example 26, the subject matter of one or any combination of Examples 18-25, wherein the first PD2DSS portion may be based on a first PD2DSS Zadoff-Chu (ZC) sequence and the second PD2DSS portion may be based on a second PD2DSS ZC sequence. The PSS may include first and second portions that are based on a third PD2DSS ZC sequence.

In Example 27, the subject matter of one or any combination of Examples 18-26, wherein the D2D channel resources may be reserved, by the network, for the D2D communication between UEs.

In Example 28, an apparatus for an Evolved Node-B (eNB) may comprise transceiver circuitry and hardware processing circuitry. The hardware processing circuitry may configure the transceiver circuitry to transmit a primary synchronization signal (PSS) to enable synchronization, by one or more User Equipments (UEs), to a network reference timing. The hardware processing circuitry may configure the transceiver circuitry to transmit a data signal to one of the UEs according to the network reference timing. The PSS may include a first PSS portion based on a Fourier Transform (FT) of a first PSS symbol sequence and may further include a second PSS portion based on an FT of a second PSS symbol sequence. Transmission times for the first and second PSS portions may be separated by a predetermined time difference.

In Example 29, the subject matter of Example 28, wherein the first PSS symbol sequence may include a first PSS Zadoff-Chu (ZC) sequence that is based on a first PSS ZC index. The second PSS symbol sequence may include a second PSS ZC sequence that is based on a second PSS ZC index.

In Example 30, the subject matter of one or any combination of Examples 28-29, wherein the second PSS ZC sequence may be based on a complex conjugation of the first PSS ZC sequence.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a User Equipment (UE), the apparatus comprising transceiver circuitry and hardware processing circuitry, the hardware processing circuitry to configure the transceiver circuitry to:
   receive, from an Evolved Node-B (eNB) arranged to operate in a network, a primary synchronization signal (PSS) that is based on one or more PSS symbol sequences; and
   transmit, to a second UE, a primary device-to-device synchronization signal (PD2DSS) for a device-to-device (D2D) communication session between the UE and the second UE, wherein the PD2DSS is based on one or more PD2DSS symbol sequences and is transmitted according to a network reference timing that is based at least partly on the reception of the PSS,
   wherein when the D2D communication session is an in-coverage D2D communication session, the PD2DSS is a first PD2DSS and is transmitted according to the network reference timing and the PD2DSS,
   wherein when the D2D communication session is an out-of-coverage D2D communication session, the PD2DSS is a second PD2DSS and is transmitted as Trichronousl to the network reference timing, and
   wherein the PD2DSS includes an indicator of whether the PD2DSS is the first PD2DSS or the second PD2DSS.

2. The apparatus according to claim 1, wherein the PD2DSS includes a first PD2DSS portion based on a Fourier Transform (FT) of a first PD2DSS symbol sequence and further includes a second PD2DSS portion based on an FT of a second PD2DSS symbol sequence.

3. The apparatus according to claim 2, wherein transmission times for the first and second PD2DSS portions are separated by a predetermined time difference.

4. The apparatus according to claim 2, wherein the PSS includes first and second PSS portions that are based on an FT of a same PSS symbol sequence.

5. The apparatus according to claim 2, wherein the PSS includes a first PSS portion that is based on an FT of a first PSS symbol sequence and a second PSS portion that is based on an FT of a second PSS symbol sequence.

6. The apparatus according to claim 2, wherein:
   the first PD2DSS symbol sequence includes a first PD2DSS Zadoff-Chu (ZC) sequence that is based on a first PD2DSS ZC index, and
   the second PD2DSS symbol sequence includes a second PD2DSS ZC sequence that is based on a second PD2DSS ZC index.

7. The apparatus according to claim 6, wherein:
   the PSS includes first and second PSS portions that are based on an FT of a PSS symbol sequence,
   the PSS symbol sequence includes a PSS ZC sequence that is based on a PSS ZC index, and
   the PSS ZC index, the first PD2DSS ZC index, and the second PD2DSS ZC index are different.

8. The apparatus according to claim 6, wherein:
   the PD2DSS is transmitted in channel resources that include a group of resource elements (REs),
   the first PD2DSS ZC sequence is mapped, according to a predetermined mapping, to at least a portion of the REs for the FT of the first PD2DSS sequence, and
   the second PD2DSS ZC sequence is mapped, according to the predetermined mapping, to the REs for the FT of the second PD2DSS sequence.

9. The apparatus according to claim 6, wherein the first and second PD2DSS ZC indexes are selected for usage in the first and second PD2DSS ZC sequences based at least partly on ambiguity functions for the first and second PD2DSS ZC sequences in a frequency offset range of at least 40 kHz.

10. The apparatus according to claim 2, wherein:
    the first PD2DSS symbol sequence includes a first PD2DSS Zadoff-Chu (ZC) sequence that is based on a first PD2DSS ZC index, and
    the second PD2DSS symbol sequence includes a second PD2DSS ZC sequence that is based on a complex conjugation of the first PD2DSS ZC sequence.

11. The apparatus according to claim 1, wherein:
    a first portion of the first PD2DSS is based on a Fourier Transform (FT) of a first Zadoff-Chu (ZC) sequence,
    a second portion of the first PD2DSS is based on an FT of a second ZC sequence,
    a first portion of the second PD2DSS includes a complex conjugation of the first portion of the first PD2DSS,
    a second portion of the second PD2DSS includes a complex conjugation of the second portion of the first PD2DSS.

12. The apparatus according to claim 1, wherein the transmission of the PD2DSS is configured to enable the second UE to determine a D2D frequency synchronization for the D2D communication session.

13. The apparatus according to claim 1, the hardware processing circuitry to further configure the transceiver circuitry to transmit, to the second UE, a data signal as part of the D2D communication session.

14. The apparatus according to claim 13, wherein the data signal is transmitted to the second UE when a network coverage for the UE is unavailable.

15. The apparatus according to claim 1, wherein the UE and the eNB are configured to operate according to a Third Generation Partnership Project (3 GPP) Long Term Evolution (UTE) protocol.

16. The apparatus according to claim 1, wherein the apparatus further includes one or more antennas coupled to the transceiver circuitry for the reception of the PSS and for the transmission of the PD2DSS.

17. A non-transitory computer-readable storage medium that stores instructions for execution by one or more processors to perform operations for communication by a User Equipment (UE), the operations to configure the one or more processors to:
    receive, in device-to-device (D2D) channel resources from a second UE, a primary device-to-device synchronization signal (PD2DSS) for a D2D communication with the second UE;
    determine a D2D frequency offset between the UE and the second UE based on a first partial correlation for a first PD2DSS portion that is based on a first PD2DSS Zadoff-Chu (ZC) sequence, and a second partial correlation for a second PD2DSS portion that based on a second PD2DSS ZC sequence;

transmit, in the D2D channel resources, a D2D data signal to the second UE according to the determined D2D frequency offset;

receive a primary synchronization signal (PSS) from an Evolved Node-B (eNB) in network channel resources exclusive to the D2D channel resources, the PSS including the first PD2DSS portion and the second PD2DSS portion that are based on a third PD2DSS ZC sequence;

determine an in-network frequency offset between the eNB and the UE based on the reception of the PSS; and transmit an in-network data signal in the network channel resources, to the eNB according to the determined in-network frequency offset.

18. The non-transitory computer-readable storage medium according to claim 17, wherein:
the first PD2DSS portion is based on a Fourier Transform (FT) of a first PD2DSS symbol sequence that includes the first PD2DSS ZC sequence, and the second PD2DSS portion is based on an FT of a second PD2DSS symbol sequence that includes the second PD2DSS ZC sequence.

19. The non-transitory computer-readable storage medium according to claim 18, wherein the second PD2DSS ZC sequence is based on a complex conjugation of the first PD2DSS ZC sequence.

20. The non-transitory computer-readable storage medium according to claim 18, wherein:
the PD2DSS is received in channel resources that include a group of D2D resource elements (REs) that are reserved for D2D communication,
the first PD2DSS ZC sequence is mapped, according to a predetermined mapping, to at least a portion of the D2D REs for the FT of the first PD2DSS sequence, and
the second PD2DSS ZC sequence is mapped, according to the predetermined mapping, to the D2D REs for the FT of the second PD2DSS sequence.

21. The non-transitory computer-readable storage medium according to claim 18, wherein the first ZC sequence is selected for usage in the first PD2DSS portion based at least partly on a timing tolerance of the first partial correlation with respect to an orthogonal frequency division multiplexing (OFDM) cyclic prefix time interval of the PD2DSS.

22. The non-transitory computer-readable storage medium according to claim 21, wherein:
the first partial correlation is used to determine a D2D timing for the reception of the PD2DSS, and the second partial correlation is used to determine the D2D frequency offset.

23. The non-transitory computer-readable storage medium according to claim 21, wherein the timing tolerance is determined for at least a 40 kHz range of frequency offset between the HE and the second HE.

24. The non-transitory computer-readable storage medium according to claim 17, wherein the D2D channel resources are reserved, by the network, for the D2D communication between UEs.

25. An apparatus for an Evolved Node-B (eNB), the apparatus comprising transceiver circuitry and hardware processing circuitry, the hardware processing circuitry to configure the transceiver circuitry to:
transmit a primary synchronization signal (PSS) to enable synchronization, by one or more User Equipments (UEs), to a network reference timing, wherein the PSS is transmitted in network channel resources exclusive to device-to-device (D2D) channel resources;
transmit a data signal to one of the UEs according to the network reference timing, wherein the PSS includes a first PD2DSS portion that is based on a first PD2DSS Zadoff-Chu (ZC) sequence, a second PD2DSS portion that based on a second PD2DSS ZC sequence, and
wherein the first PD2DSS portion and the second PD2DSS portion are based on a third PD2DSS ZC sequence; and
receive from the one of the UEs, in the network channel resources, an in-network data signal based on an in-network frequency offset.

26. The apparatus according to claim 25, wherein:
the PSS includes a first PSS portion based on a Fourier Transfoiiii (FT) of a first PSS symbol sequence and further includes a second PSS portion based on an FT of a second PSS symbol sequence,
the first PSS symbol sequence includes a first PSS Zadoff-Chu (ZC) sequence that is based on a first PSS ZC index, and
the second PSS symbol sequence includes a second PSS ZC sequence that is based on a second PSS ZC index.

27. The apparatus according to claim 26, wherein the second PSS ZC sequence is based on a complex conjugation of the first PSS ZC sequence.

* * * * *

UNITED STATES PATENT AND TRADEMARK OFFICE
CERTIFICATE OF CORRECTION

PATENT NO. : 10,194,411 B2  
APPLICATION NO. : 15/505387  
DATED : January 29, 2019  
INVENTOR(S) : Shilov et al.

Page 1 of 1

It is certified that error appears in the above-identified patent and that said Letters Patent is hereby corrected as shown below:

In the Claims

Column 23, Lines 39-40, in Claim 1, delete "as Trichronousl" and insert --asynchronously-- therefor Column 24, Line 51, in Claim 15, delete "(UTE)" and insert --(LTE)-- therefor Column 25, Line 15, in Claim 17, after "signal", insert --,--

Column 25, Line 23, in Claim 18, after "and", insert --¶--

Column 26, Line 4, in Claim 22, after "and", insert --¶--

Column 26, Line 10, in Claim 23, delete "HE" and insert --UE-- therefor

Column 26, Line 10, in Claim 23, delete "HE." and insert --UE.-- therefor

Column 26, Line 36, in Claim 26, delete "Transfoiiii" and insert --Transform-- therefor Signed and Sealed this  
Twenty-first Day of April, 2020

Andrei Iancu  
*Director of the United States Patent and Trademark Office*